(12) United States Patent
O'Hare et al.

(10) Patent No.: US 10,882,068 B2
(45) Date of Patent: Jan. 5, 2021

(54) CAM DIE COATING SYSTEMS

(71) Applicant: 3M INNOVATIVE PROPERTIES COMPANY, St. Paul, MN (US)

(72) Inventors: Jonathan J. O'Hare, Oakdale, MN (US); Karl K. Stensvad, Inver Grove Heights, MN (US); Daniel H. Carlson, Arden Hills, MN (US); Glen A. Jerry, Blaine, MN (US); Mikhail L. Pekurovsky, Bloomington, MN (US); Gary W. Maier, Roberts, WI (US); James Zhu, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 5 days.

(21) Appl. No.: 16/304,352

(22) PCT Filed: May 15, 2017

(86) PCT No.: PCT/US2017/032607
§ 371 (c)(1),
(2) Date: Nov. 26, 2018

(87) PCT Pub. No.: WO2017/209926
PCT Pub. Date: Dec. 7, 2017

(65) Prior Publication Data
US 2019/0217324 A1      Jul. 18, 2019

Related U.S. Application Data

(60) Provisional application No. 62/479,510, filed on Mar. 31, 2017, provisional application No. 62/343,608, filed on May 31, 2016.

(51) Int. Cl.
*B05C 5/02* (2006.01)
*B05C 9/06* (2006.01)
(Continued)

(52) U.S. Cl.
CPC .......... *B05C 5/0275* (2013.01); *B05C 5/0233* (2013.01); *B05C 5/0258* (2013.01);
(Continued)

(58) Field of Classification Search
CPC ....... B05C 5/0275; B05C 9/06; B05C 5/0258; B05C 5/0233; B05C 5/025; B05C 5/0254;
(Continued)

(56) References Cited

U.S. PATENT DOCUMENTS 3,435,804 A * 4/1969 Orlowski ............... A01K 61/85
119/51.11
4,118,163 A * 10/1978 Lee ......................... B29C 48/51
425/146
(Continued)

FOREIGN PATENT DOCUMENTS

EP          0276119           7/1988
EP          1764231 A2        3/2007
(Continued)

OTHER PUBLICATIONS

International Search Report for PCT International Application No. PCT/US2017/032607, dated Aug. 23, 2017, 3 pages.

*Primary Examiner* — Laura Edwards
(74) *Attorney, Agent, or Firm* — Yufeng Dong

(57) ABSTRACT

Coating apparatuses and methods are provided for direct coatings with various shapes. The coating apparatus includes a die body with one or more bores. One or more cams are pivotally mounted within the bores and have one or more recessed areas formed into the respective peripheral surfaces thereof. The one or more cams are rotatable within the die body to dynamically, independently vary the width or shape of the respectively dispensed one or more fluid coatings.

19 Claims, 11 Drawing Sheets

(51) Int. Cl.
*B05D 1/26* (2006.01)
*B29C 48/25* (2019.01)
*B29C 48/255* (2019.01)
*B29C 65/52* (2006.01)
*B29C 48/465* (2019.01)

(52) U.S. Cl.
CPC ............... *B05C 9/06* (2013.01); *B05D 1/265* (2013.01); *B29C 48/2552* (2019.02); *B29C 48/2556* (2019.02); *B29C 48/2694* (2019.02); *B29C 48/468* (2019.02); *B29C 65/525* (2013.01)

(58) Field of Classification Search
CPC ... B05C 5/0262; B05C 5/0266; B29C 65/524; B29C 65/525; B29C 65/526; B29C 48/255; B29C 48/2552; B29C 48/2556; B29C 48/269; B29C 48/2694; B29C 48/465; B29C 48/467; B29C 48/468; Y10T 156/1798; B05D 1/265; B05D 1/126
USPC ........................ 425/132, 382.3, 465; 118/410
See application file for complete search history.

(56) References Cited

U.S. PATENT DOCUMENTS

| | | | | |
|---|---|---|---|---|
| 4,454,943 A | * | 6/1984 | Moller | ................ B65G 33/24 198/657 |
| 5,200,204 A | * | 4/1993 | Horton | ............... B29C 48/6801 425/188 |
| 5,750,159 A | | 5/1998 | Delmore | |
| 6,464,785 B1 | | 10/2002 | Puffe | |
| 6,663,375 B1 | | 12/2003 | Ulcej | |
| 7,752,995 B2 | | 7/2010 | Tremblay | |
| 2003/0173429 A1 | | 9/2003 | Puffe | |
| 2003/0230647 A1 | * | 12/2003 | Puffe | ..................... B05C 5/025 239/550 |
| 2006/0016391 A1 | | 1/2006 | Puffe | |
| 2011/0132940 A1 | | 6/2011 | Peschka et al. | |
| 2013/0327269 A1 | | 12/2013 | Suhara | |

FOREIGN PATENT DOCUMENTS

| | | |
|---|---|---|
| JP | 05084458 | 4/1993 |
| JP | 10192762 | 7/1998 |
| JP | 2003112220 | 4/2003 |
| WO | WO 2014-088936 | 6/2014 |
| WO | WO 2014-088939 | 6/2014 |

* cited by examiner

US 10,882,068 B2

CAM DIE COATING SYSTEMS

CROSS REFERENCE TO RELATED APPLICATIONS

This application is a national stage filing under 35 U.S.C. 371 of PCT/US2017/032607, filed May 15, 2017, which claims the benefit of U.S. Application No. 62/343,608, filed May 31, 2016, and U.S. Application No. 62/479,510, filed Mar. 31, 2017, the disclosure of which is incorporated by reference in its/their entirety herein.

TECHNICAL FIELD

The present disclosure relates to die coating systems including one or more rotatable cams inside a die body and methods of using the same to coat various shapes.

BACKGROUND

Available die coating systems rely on highly accurate and stable die geometry and fluid delivery to produce stable coatings. Starts and stops of the coating as well as width changes may lead to non-uniform coatings. Many products begin as a continuously coated web and are cut down to their final form in a converting process such as rotary die cutting or laser cutting. The weed from the converting process is often not directly reusable and is thus waste. Various die coating techniques are described in, for example, U.S. Pat. No. 5,750,159 (Delmore et al.) and U.S. Pat. No. 6,464,785 (Puffe), and U.S. Patent Application Pub. No. 2013/0327269 (Suhara).

SUMMARY

Briefly, in one aspect, the present disclosure describes a coating apparatus including a die body having an inner wall defining a bore and a dispensing opening extending along a cross direction. At least a portion of a cam is pivotally mounted within the bore. The cam includes one or more recessed areas formed into a peripheral surface of the cam. The recessed areas of the cam is capable of intersecting with the dispensing opening of the die body to form one or more fluid connection regions. A seal plate is attached to the die body and configured to provide sealing engagement therebetween. The seal plate includes an opening aligned with the dispensing opening of the die body. The peripheral surface of the cam is in sealing engagement with the seal plate to at least partially block the opening of the seal plate, and the cam is rotatable about a central axis thereof within the die body to vary the fluid connection regions such that a width or shape of a dispensed fluid coating is dynamically changeable.

In another aspect, the present disclosure describes a method including providing a die body including an inner wall defining a bore, and providing a cam having at least a portion being pivotally mounted within the bore. The cam includes one or more recessed areas formed into a peripheral surface of the cam, and the recessed areas of the cam are capable of intersecting with the dispensing opening of the die body to form one or more fluid connection regions. A seal plate is attached to the die body and configured to provide sealing engagement therebetween. The seal plate includes an opening aligned with the dispensing opening of the die body. The peripheral surface of the cam is in sealing engagement with the seal plate to at least partially block the opening of the seal plate. The method further includes supplying fluid at a flow rate into the bore of the die body, and rotating the cam about a central axis thereof within the die body while dispensing the fluid to vary the fluid connection regions such that a width or shape of a dispensed fluid coating along the cross direction is dynamically changeable.

Various unexpected results and advantages are obtained in exemplary embodiments of the disclosure. One such advantage of exemplary embodiments of the present disclosure is that a width or shape of a dispensed fluid coating is dynamically changeable which enables the direct die coating of programmatically variable discrete shapes with a minimum or no converting waste. Some coating apparatuses and methods described herein can produce articles that previously could not bear the converting waste, in particular when the raw material is expensive and/or the products have a shape with a low nesting efficiency such as, for example, a circular shape, an oval shape, a donut shape, a ring shape, etc.

In another aspect, the present disclosure describes a coating apparatus including a die body, and a plurality of bores including first and second bores inside the die body. Each bore extends along a cross direction of the die body and being fluidly separated from each other. Multiple cams including first and second cams each having at least a portion are pivotally mounted within the respective first or second bore to control dispensing of first and second fluid materials therefrom. The first and second cams each include one or more recessed areas formed into a peripheral surface thereof. A dispensing zone is configured to dispense the first and second fluid materials. The first and second cams each are rotatable within the die body such that a width or shape of a first fluid coating of the first fluid material and a second fluid coating of the second fluid material are dynamically, independently changeable.

In another aspect, the present disclosure describes a method including providing a die body having a plurality of bores including first and second bores each extending along a cross direction, and providing a plurality of cams including first and second cams each having at least a portion being pivotally mounted within the respective first and second bores. The first and second cams each include one or more recessed areas formed into a peripheral surface of the respective cam. The method further includes providing a dispensing zone configured to dispense a plurality of fluid materials including first and second fluid materials; and controlling, via rotation of the first and second cams inside the respective bores, dispensing of first and second fluid materials onto a moving substrate to form a first fluid coating of the first fluid material and a second fluid coating of the second fluid material such that a width or shape of a first fluid coating of the first fluid material and a second fluid coating of the second fluid material are dynamically, independently changeable.

Various unexpected results and advantages are obtained in exemplary embodiments of the disclosure. One such advantage of exemplary embodiments of the present disclosure is that the width or shape of multiple dispensed fluid coatings can be dynamically, independently changeable which enables the direct die coating of programmatically variable discrete shapes of multiple coating materials with a minimum or no converting waste.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which:

FIG. 3' is a partial cross-sectional view of a coating apparatus, according to another embodiment.

Figure 1:
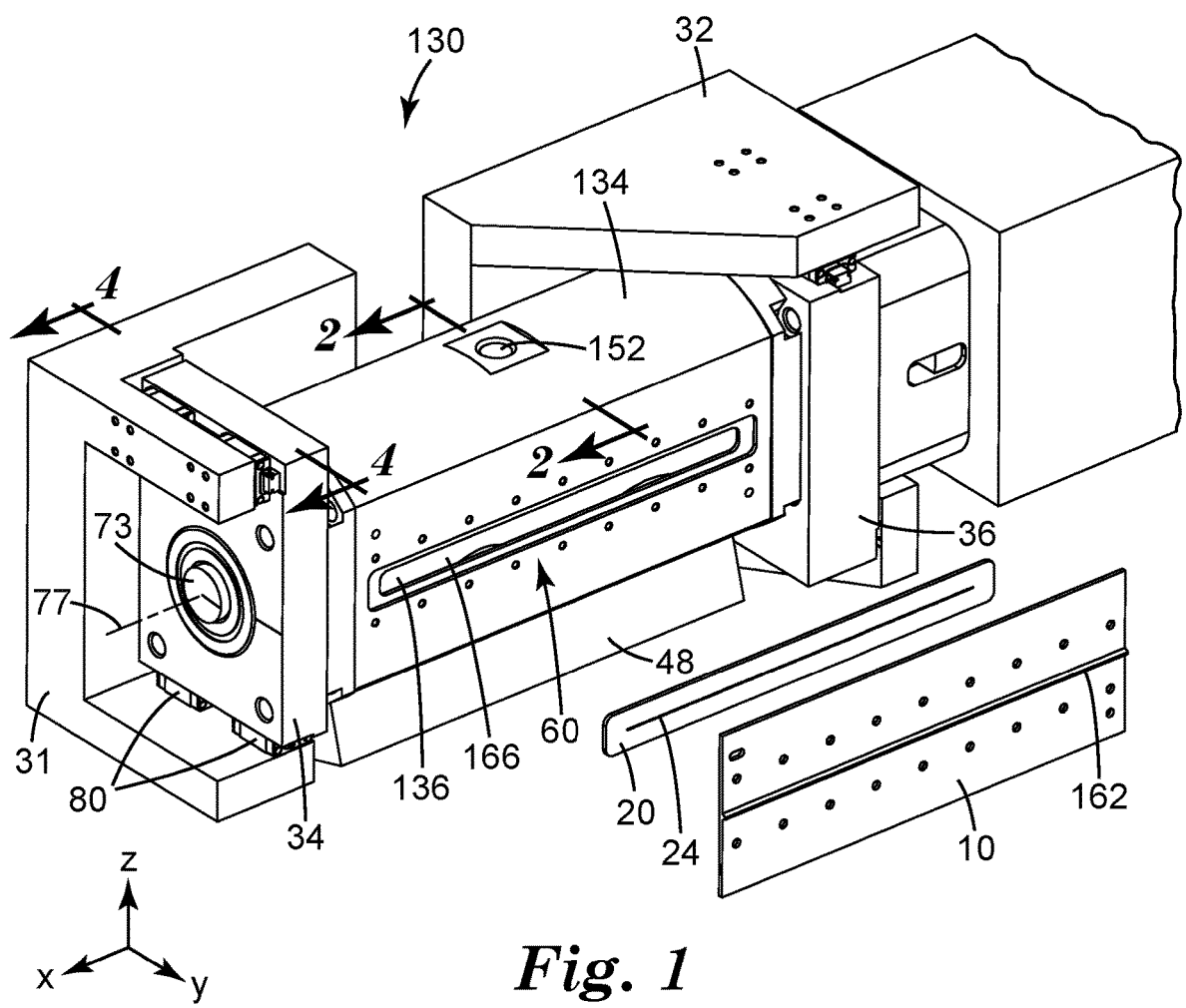
FIG. 1 is a perspective view in exploded form of a coating apparatus, according to one embodiment of the present disclosure.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that:

The term "die coating" refers to a process of applying a variety of coating materials (e.g., liquid) from an internal manifold, cavity or dispensing chamber of a die body through a dispensing zone or die lip thereof. In some cases, the coating materials can be dispensed onto a substrate at a controlled rate while the substrate is moved relative to the coating die.

The term "dynamically" means that the rotation of a cam inside a bore of a die body occurs at a high rate of rotational velocity, for example, at a rate fast enough to change the width or shape of a dispensed fluid coating in real time, resulting in an article that varies in width or shape as part of its intended function.

The term "adjoining" with reference to a particular layer means joined with or attached to another layer, in a position wherein the two layers are either next to (i.e., adjacent to) and directly contacting each other, or contiguous with each other but not in direct contact (i.e., there are one or more additional layers intervening between the layers).

By using terms of orientation such as "atop", "on", "over," "covering", "uppermost", "underlying", "bottom", "upper" and the like for the location of various elements in the disclosed apparatuses, we refer to the relative position of an element with respect to a horizontally-disposed, upwardly-facing substrate. However, unless otherwise indicated, it is not intended that the substrate or articles should have any particular orientation in space during or after manufacture.

By using the term "overcoated" to describe the position of a layer with respect to a substrate or other element of an article of the present disclosure, we refer to the layer as being atop the substrate or other element, but not necessarily contiguous to either the substrate or the other element.

The terms "about" or "approximately" with reference to a numerical value or a shape means+/− five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

Figure 2:
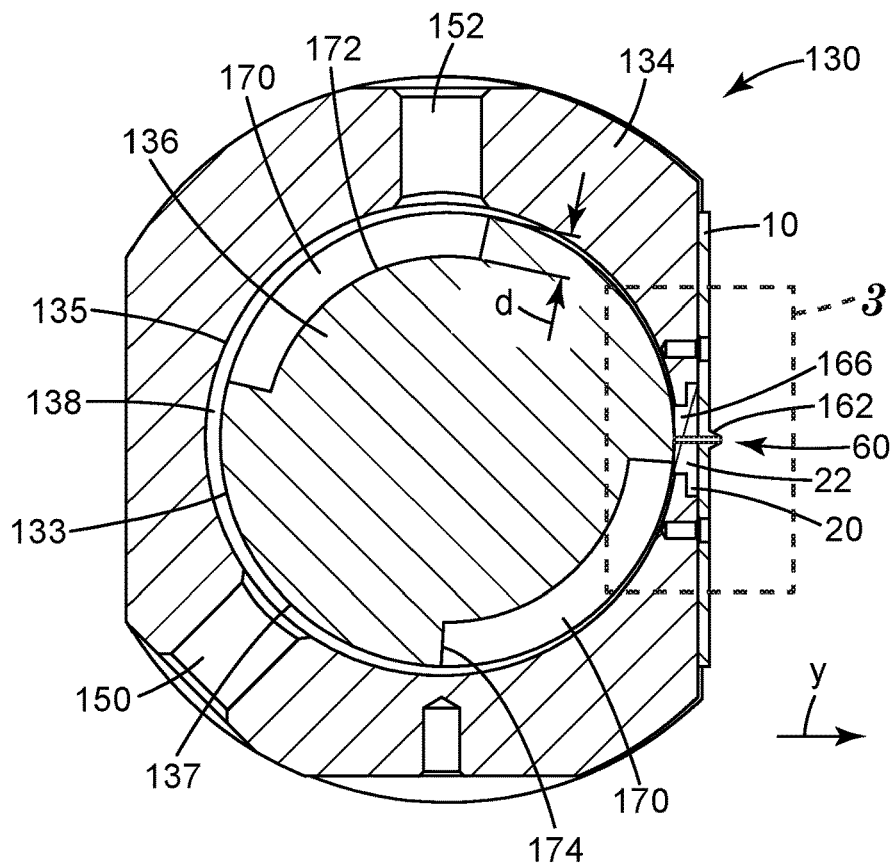
FIG. 2 is a cross-sectional side view taken along section lines 2-2 in FIG. 1.

Referring now to FIG. 1, a perspective view of a coating apparatus 130 is illustrated, according to one embodiment. The coating apparatus 130 includes a coating die which in turn includes a die body 134 attached to a body mount 48. FIG. 2 illustrates a cross-sectional view of the coating apparatus 130 along a line 2-2. The die body 134 includes a bore 138 defined by an inner wall 135 thereof. The bore 138 is formed with a central axis thereof extending substantially along a longitudinal direction of the die body 134. In some embodiments, the bore 138 may have a cylindrical shape. The die body 134 further includes an inlet port 150 and a bleed port 152 in fluid communication with the bore 138.

Figure 3:
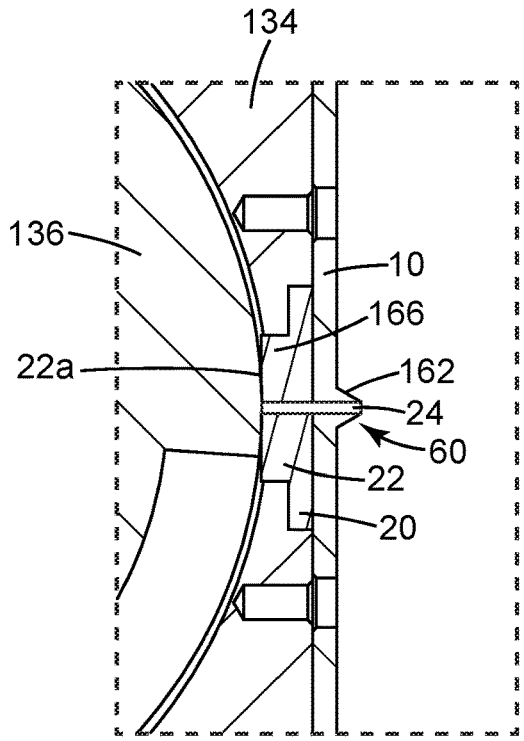
FIG. 3 is an enlarged partial view of the coating apparatus in FIG. 2.
Figure 3:
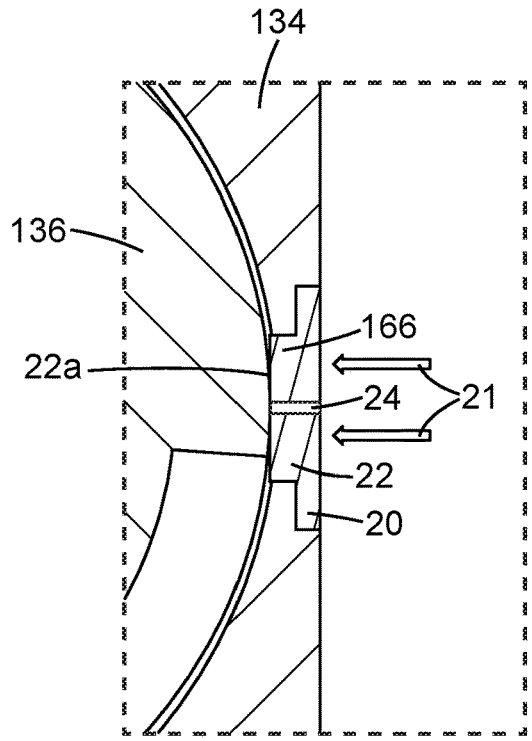

In some embodiments, the die body 134 may be supported adjacent to a substrate to be coated, for example, a web of indefinite length being conveyed through a web path. Material to be coated by the coating apparatus 130 can enter the bore 138 of the die body 134 via the inlet port 150, and can be dispensed through a dispensing zone 60. An enlarged cross-sectional view of the dispensing zone 60 is shown in FIG. 3 which will be described further below. The dispensing zone 60 extends along a cross direction that is substantially parallel to the longitudinal direction of the die body 134 (i.e., the x axis). The substrate can be moved along a machine direction which is substantially parallel to the z axis.

In some embodiments, the die body 134 may have a one-piece construction. In other embodiments, the die body 134 may include a front body section and a rear body section that can be assembled together where the dispensing zone 60 can be located adjacent the front body section and a majority of the bore 138 can be defined within the rear body section.

Figure 5:
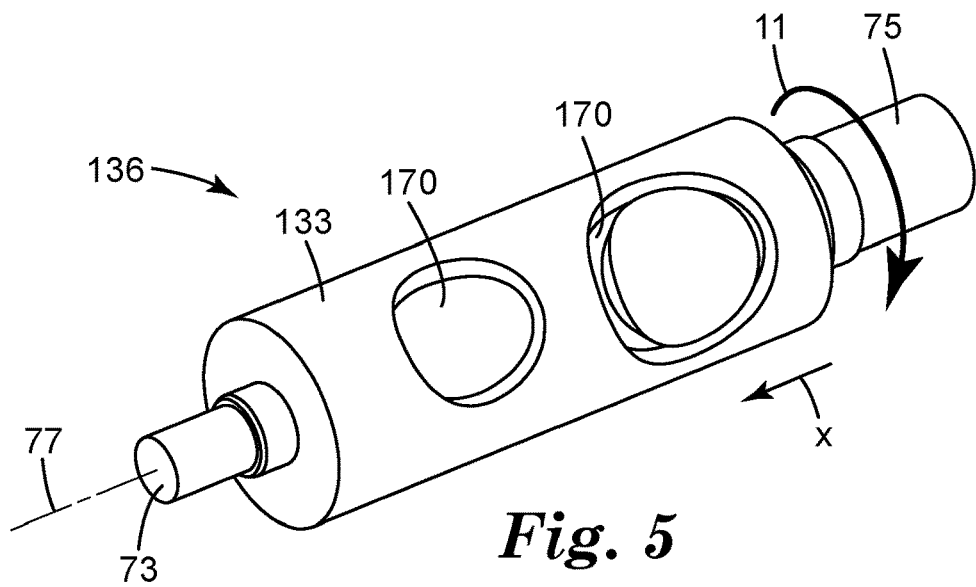
FIG. 5 is a perspective side view of a cam, according to one embodiment of the present disclosure.

The coating apparatus 130 further includes a cam 136 mounted inside the bore 138 of the die body 134. The cam 136 is pivotally mounted mostly within the bore 138 of the die body 134. FIG. 5 illustrates a side perspective view of the cam 136. The cam 136 has a cam shaft extends along a central axis 77 between opposite ends 73 and 75. When the cam 136 is assembled into the die body 134, the cam shaft can be rotatably supported at the respective ends 73 and 75 by bearing blocks 34 and 36 as shown in FIG. 1. The bearing blocks 34 and 36 can be respectively mounted to supporting structures 31 and 32. The cam shaft of the cam 136 can be rotated about the central axis 77 by, for example, a servo motor functionally connected to the end 75 of the cam shaft. In some embodiments, the end 75 of the cam shaft can be attached to a coupling, which can functionally connect the cam 136 to the servo motor controlled by a motor controller via a cable connection.

In some embodiments, the cam 136 can be disposed to be offset inside the bore 138. As shown in FIG. 2, the bore 138 has an inner diameter slightly greater than the outer diameter of the cam 136. In some embodiments, the inner diameter of the cam 136 can be, for example, about 20%, about 10%, about 5%, or about 1% greater than the outer diameter of the cam 136. The cam 136 is disposed to lean slightly towards the dispensing zone 60 such that the central axis (e.g., 77 in FIG. 5) of the cam 136 offset with respect to the central axis of the bore 138. The bore 138 of the die body 134 is oversized such that a gap 137 is formed between the peripheral surface 133 of the cam 136 and the inner wall 135 of the die body 134. The gap 137 can gradually decrease to about zero when it approaches the dispensing zone 60 where the peripheral surface 133 of the cam 134 can be in a sealing engagement with a seal plate 22 which will be discussed further below. The gap 137 allows the introduction of fluid into the bore 138 through the inlet port 150 which can be located on the side of the die body 134 opposite to the dispensing zone 60. Also, the gap 137 may facilitate the rotation of the cam 136 inside the bore 138 by reducing the friction force between the peripheral surface 133 of the cam 136 and the inner wall 135 of the die body 134, especially when the gap 137 is filled with fluid to be dispensed.

Figure 4:
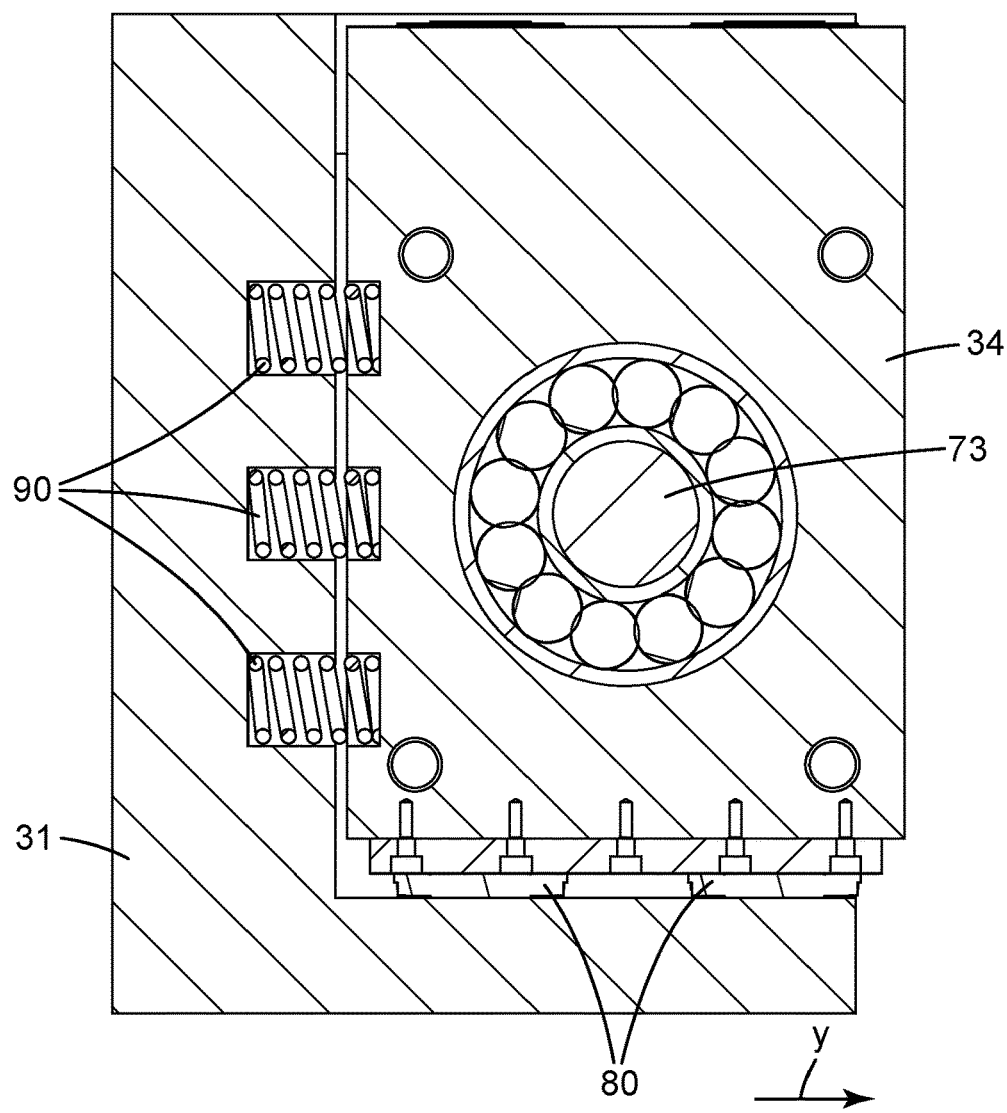
FIG. 4 is a cross-sectional side view taken along section lines 4-4 in FIG. 1.

In some embodiments, the cam 136 can be biased by one or more spring members so as to press against the inner wall 135 of the die body 134 on the side adjacent to the dispensing zone 60. In the embodiment depicted in FIG. 4, the end 73 of the cam 136 is biased by loading the bearing block 34 with spring members 90 attached on the structure 31 which is fixed to the die body 134 or the body mount 48 (see also FIG. 1). Further, a linear guide 80 can be provided to guide the movement of bearing block 34 along a direction substantially parallel to the y axis. Similarly, the other end 75 of the cam 136 can be biased by loading the bearing block 36 with suitable spring members attached on the structure 32. It is to be understood that in other embodiments, the central axis of the cam 136 can be fixed to eliminate a translational degree of freedom along the y axis, and one or more spring members can be loaded on the side of the seal plate 22 to enhance the sealing engagement between the peripheral surface 133 of the cam 134 and the seal plate 22. It is to be understood that the spring member can be any suitable biasing mechanism including, for example, mechanical springs, pneumatic actuators, flexure mechanisms, actively controlled actuators, etc.

As shown in FIGS. 2 and 5, the cam 136 includes at least one recessed area 170 formed into a peripheral surface 133 thereof. The recessed area 170 of the cam 136 can define at least one cavity or dispensing chamber to receive coating materials when the cam 136 is assembled into the bore 138 of the die body 134. Each of the recessed areas 170 is defined by a bottom surface 172 that may extend along a peripheral direction of the cam 13 (e.g., substantially perpendicular to a radial direction of the cam 136), and a side wall 174 that may extend with a depth d in the radial direction of the cam 136. The depth d of the recessed area 170 may be in a range of, for example, about 1/100 to about ½ of the diameter of the cam 136. The recessed area 170 is located at the peripheral surface 133 of the cam 136. The cam 136 may be solid or hollow, and the recessed area 170 may not be in fluid communication with an internal space of the cam 136. The recessed area 170 may have an in-plane shape including, for example, a triangular shape, a diamond-shape, a circular shape, an oval shape, a ring shape, a donut shape, etc. The embodiment of FIG. 5 illustrates two recessed areas 170 having a circular shape and a ring shape, respectively.

The coating apparatus 130 further includes a seal plate 20 that is in sealing engagement with the die body 134 at the dispensing zone 60. In some embodiments, the coating apparatus 130 further includes a die lip plate 10 with the seal plate 20 disposed between the die lip plate 10 and the die body 134. See FIGS. 1, 2, 3 and 6. The die lip plate 10 includes a die lip 162 extending along the cross direction (e.g., the x axis). In some embodiments, the die lip 162 can include a slot, an array of orifices, or a combination thereof extending along the cross direction. The seal plate 20 includes a slot or an array of orifices 24 (see also in FIG. 6). When the die lip plate 10 and the seal plate 20 are assembled to the die body 134, the slot or orifices of the die lip 162 can be in fluid communication with an opening 166 of the die body 134 through the slot or orifices 24 of the seal plate. The opening 166 of the die body 134 has a slot shape extending along the cross direction substantially parallel to the x axis. The seal plate 20 is disposed between the opening 166 of the die body 134 and the die lip plate 10 to provide sealing engagement in a liquid-tight manner. The opening 24 of the seal plate 20 allows the fluid communication between the opening 166 of the die body 134 and the die lip 162 of the die lip plate 10 so as to form the dispensing zone 60. The opening 24 of the seal plate 20 is aligned with the die lip 162 of the die lip plate 10, and can include a slot, an array of orifices, or a combination thereof.

Material to be coated by the coating apparatus 130 can enter the bore 138 via one or more inlet port (e.g., the inlet port 150 of FIG. 2) and can be dispensed through the dispensing zone 60 (e.g., through the opening 24 of the seal plate 20, and through the die lip 162) onto a moving substrate. Excess fluid in the bore 138 can be directed out through the bleed port 152.

Figure 6:
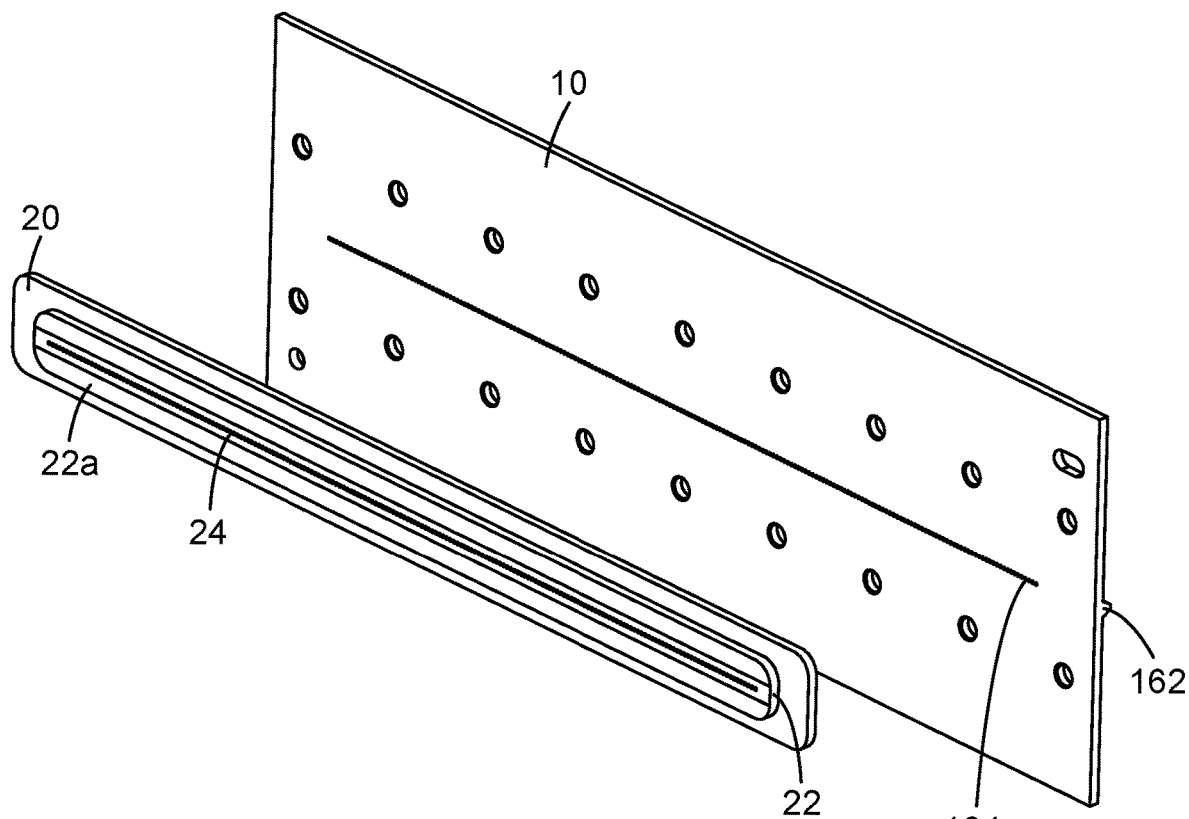
FIG. 6 is a perspective side view in exploded form of a die lip plate and a seal plate, according to one embodiment of the present disclosure.

FIG. 6 illustrates a side perspective view in exploded form of the seal plate 20 and the die lip plate 10. The die lip 162 includes a slot or an array of orifices 164 configured to be in fluid communication with the opening 24 of the seal plate 20. It is to be understood that the die lip 162 and the opening 24 may respectively include a slot, an array of orifices, or a combination thereof. The seal plate 20 includes a protruding member 22 that fits through the opening 166 of the die body 134 when the seal plate 20 and the die body 134 are assembled together (see in FIG. 3). A rearwardly-facing wall section 22a of the protruding member 22 is in sealing engagement with a portion of the peripheral surface 133 of the cam 136. In some embodiments, the seal plate 20 and the die lip plate 10 may be integrated as a one-piece structure that can provide sealing engagement and one or more die lips for dispensing coating materials. In some embodiments, a separate die lip plate may not be required. For example, in the embodiment shown in FIG. 3', the opening 24 of the seal plate 20 can form a die lip for dispensing coating materials.

In some embodiments, a force can be applied to at least one of the cam 136, the seal plate 20, or the die lip plate 10 to provide a sealing pressure between the cam 136 and the protruding member 22 of the seal plate 20. For example, in the embodiment of FIG. 4, the spring members 90 can bias the bearing block 34 which in turn presses the cam 136 against the seal plate 20. The cam 136 can float with respect to the die body 134 in a translational degree of freedom substantially perpendicular to a sealing interface of the seal plate 20.

In some embodiments, a force can be applied from the side of seal plate 20 to press the seal plate 20 against the cam 136. For example, in the embodiment of FIG. 3', a force indicated by arrows 21 is applied to press the seal plate 20 against the cam 136. In some embodiments, the seal plate 20 can be fixed to the die body 134 which can float with respect to the cam 136. In some embodiments, the seal plate 20 can float with respect to the cam 136 and the die body 134 which can be fixed to the body mount 48.

In some embodiments, the protruding member 22 of the seal plate 20 may be deformable under the sealing pressure. In some embodiments, the rearwardly-facing wall section 22a can have a radius of curvature that matches the radius of curvature of the peripheral surface 133 of the cam 136. The seal plate 20 can be made of a rigid or flexible material such as, for example, polytetrafluoroethylene (PTFE), ultra-high molecular weight (UHMW) polyethylene, carbon, graphite, etc.

Figure 7:
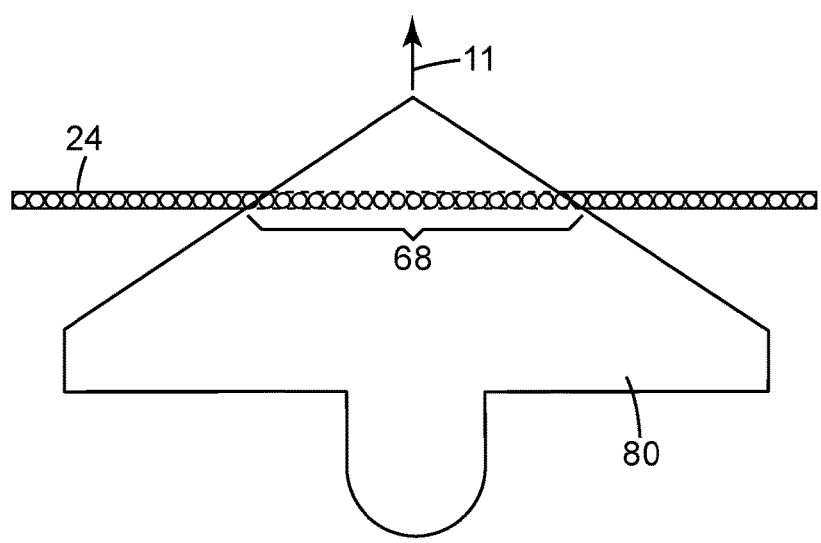
FIG. 7 is a schematic view of a dispensing chamber of a cam disposed with respect to outlet ports, according to one embodiment.

FIG. 7 illustrates a schematic view of a dispensing chamber 80 formed by one or more recessed areas (e.g., the recessed area 170 of FIG. 5) on a peripheral surface of a cam. Referring to FIGS. 1-7, when the cam rotates about the central axis thereof to a position as shown FIG. 7, the dispensing chamber 80 overlaps a portion 68 of the opening 24 of the seal plate 20. That is, the opening 24 has a fluid connection region 68 that is in fluid communication with the dispensing chamber 80. When the cam 136 rotates inside the bore of the die body, the peripheral surface 133 of the cam 136 can serve as a sealing surface which is in sealing engagement with the seal plate 20 to variably block the opening 24 of the seal plate 20 such that the width or shape of the fluid connection region 68 is dynamically adjustable by rotating the cam.

The shape of a recessed area or dispensing chamber can be chosen so that as the cam 136 rotates along the direction 11 inside the bore 138, the width of the opening 24 that is put in fluid communication with the cavity or dispensing chamber 80 may be changed to e.g. modify the width or shape of the resultant coating. With differently shaped recessed areas, conveniently shaped patches of coated material may thusly be laid down on e.g. a web of indefinite length material in a roll-to-roll process. In many convenient embodiments, the depth of recessed area and the size of the opening 24 can be deliberately chosen so that there is negligible difference in the pressure drop experienced at the die lip 162.

Figure 8A:
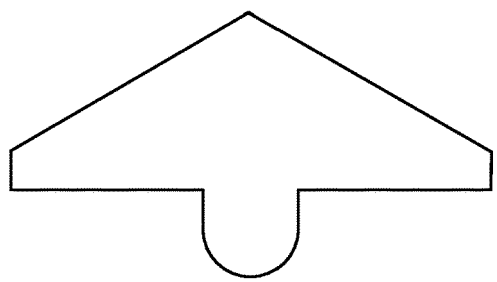
FIG. 8a is a schematic view of a cam, according to one embodiment.
Figure 8B:
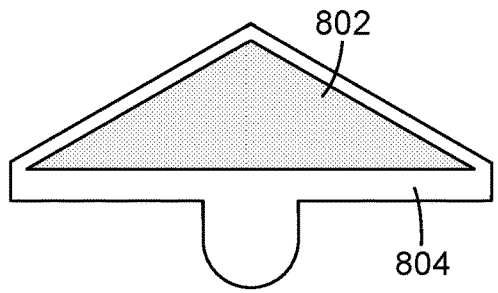
FIG. 8b is a schematic view of a cam, according to another embodiment.
Figure 8C:
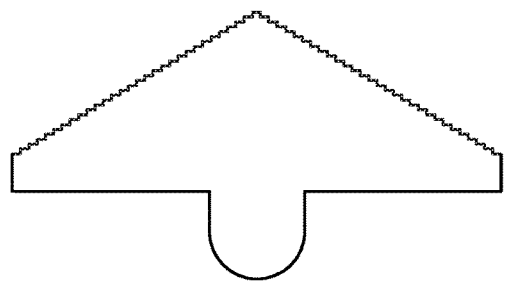
FIG. 8c is a schematic view of a cam, according to another embodiment.
Figure 8D:
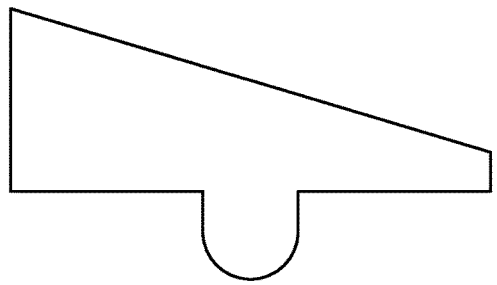
FIG. 8d is a schematic view of a cam, according to another embodiment.
Figure 8E:
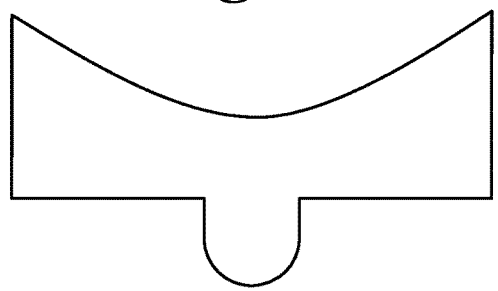
FIG. 8e is a schematic view of a cam, according to another embodiment.
Figure 8F:
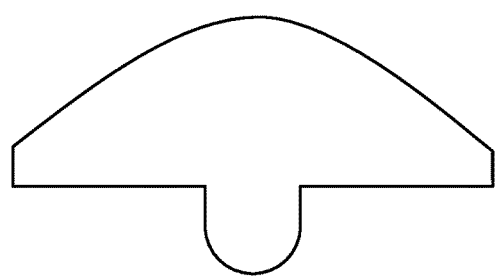
FIG. 8f is a schematic view of a cam, according to another embodiment.
Figure 8G:
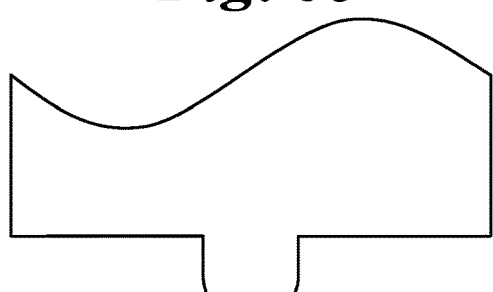
FIG. 8g is a schematic view of a cam, according to another embodiment.
Figure 8H:
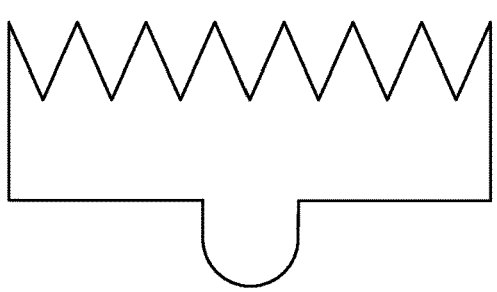
FIG. 8h is a schematic view of a cam, according to another embodiment.
Figure 8I:
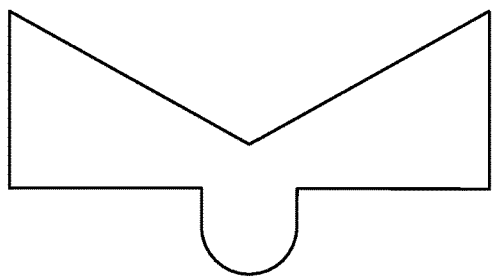
FIG. 8i is a schematic view of a cam, according to another embodiment.
Figure 9:
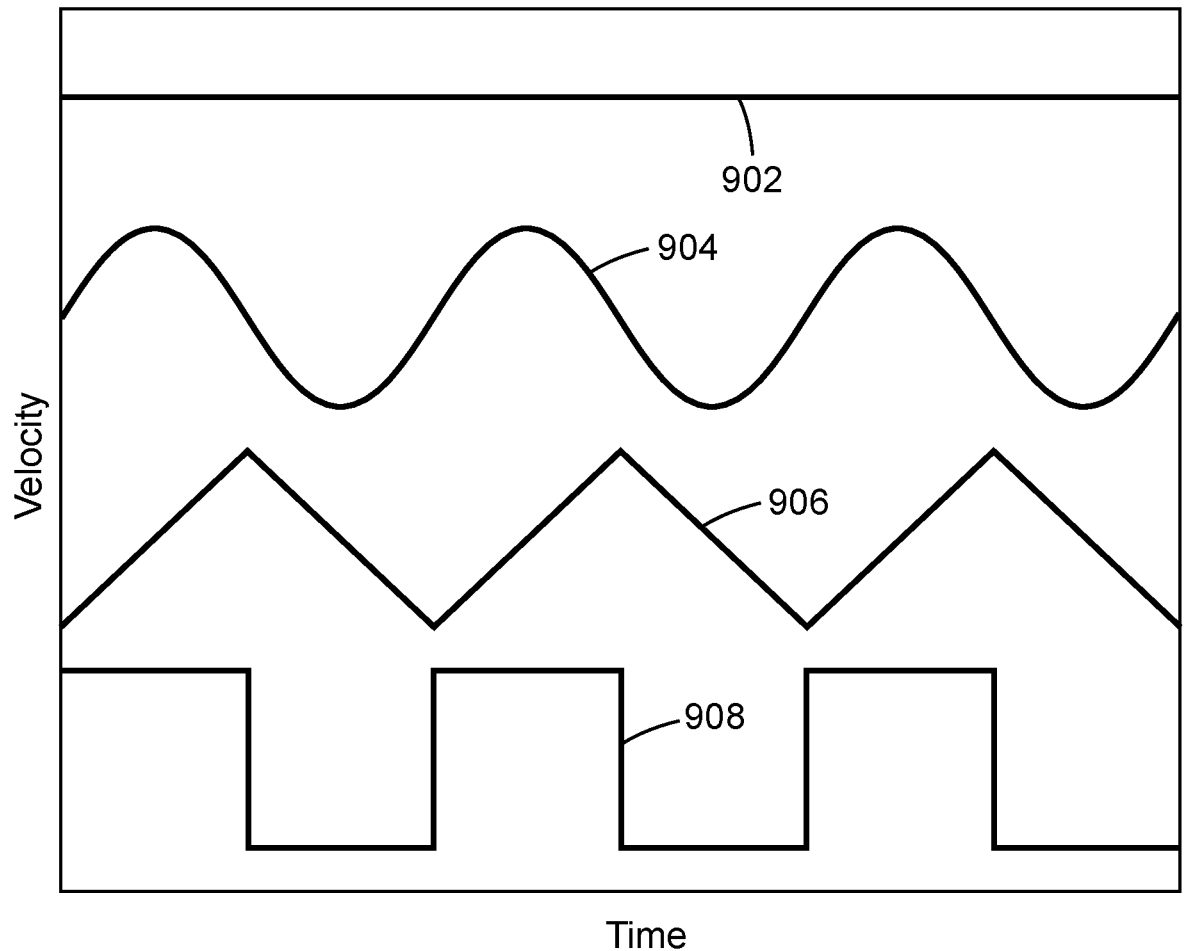
FIG. 9 illustrates various rotational velocity profiles of a cam rotating inside a die body.

Referring now to FIGS. 8a through 8i, the patterns of various recessed areas from various embodiments of the cam 136 are shown, unwrapped from their usual circumferential state around the surface of cam 136, and projected flat. A number of different, useful continuous coatings and discontinuous patches may be dispensed onto sheets or webs using one of these embodiments. For example, FIG. 8a illustrates a substantially triangular shaped recessed area on a cam. The dispensed article formed by using the cam of FIG. 8a may have a corresponding shape including, for example, a triangular shape, a diamond-shape, a circular shape, an oval shape, etc., which may depend on the rotational velocity profile of the cam 136. FIG. 9 illustrates exemplary rotational velocity profiles 902, 904, 906 and 908 of a cam. FIG. 8b illustrates a cam having a solid sealing region 802 inside a recessed area which changes the recessed area to a triangular strip shape 804. The solid sealing region 802 can be in sealing engagement with the inner wall of the die body. The dispensed article formed from the cam of FIG. 8b may have a corresponding shape including, for example, a ring shape.

In some embodiments, the coating apparatuses described herein can further include a pump and a control system. The pump can be, for example, a high bandwidth precision pump that is in fluid communication with an input port (e.g., the input ports 150 of FIG. 2) of the die body 134. The pump is configured to supply the coating into the bore 138 of the die body 134 at an adjustable flow rate.

The control system can be functionally connected to the servo motor and the pump to actively coordinate the motion of the cam, the pump and optionally the coating gap and substrate speed such that coatings of actively controllable width, shapes, and/or thickness can be dispensed onto a moving substrate.

In some embodiments, the flow rate of coating materials can be synchronously adjusted, via the control system, while rotating the cam inside the bore of the die body. The control system can also control the substrate motion (e.g., speed and directions) and coordinate it with the fluid flow and the slot width of a coating die to form various shaped coatings on the substrate.

The coating apparatuses and methods described herein can be used for precisely coating stripes or patches of liquid with various shapes or patterns on a substrate. In some embodiments, the coatings can have a non-rectangular shape such as, for example, a round shape, an oval shape, a ring shape, a donut shape, an irregular shape, a closed shape, or any combinations thereof. The various shaped articles can include one or more directly formed discrete patches and/or continuous stripes formed with minimum converting waste.

The present disclosure provides systems and methods for dynamically adjusting the width or shape of a dispensed fluid coating. The term "dynamically" means that the adjustment occurs at a high rate of speed, for example, at a rate fast enough to change the width or shape of a dispensed fluid coating in real time, resulting in an article that varies in width or shape as part of its intended function. For example, various shaped articles such as circular, oval, triangular, or ring shaped articles can be created without post converting. The dynamical adjustment described herein is different from a simple static change in slot width or shape that might be employed in a setup operation.

The shape of the liquid coating on a substrate may correspond to the shape of the recessed area formed into the peripheral surface of a cam. In some embodiments, as the speed of the substrate is increased (e.g., to achieve increasingly higher article throughput) or the shape becomes more complex, the high frequency components of the substrates shape (such as corners and other rapidly changing features) may degrade in fidelity, until at some speed or complexity it might be difficult to achieve acceptable fidelity and/or throughput. In these cases, the shape of recessed areas of the cam may be modified such that it minimizes the demands placed on the motion system. For example when creating a circular article, by replacing the cam having triangular-shaped recessed areas with another cam having circular-shaped recessed area, the desired shape can now be made by a continuous motion profile, and this may require substantially less bandwidth from the cam. This allows higher article throughput. Similarly, using a cam with sharp transitions can also substantially reduce the required cam motion bandwidth. These adaptations allow higher throughputs, but may reduce the number of possible shapes, or require changing the cam to make alternate shapes.

Various unexpected results and advantages are obtained in exemplary embodiments of the disclosure. One such advantage of exemplary embodiments of the present disclosure is that the effective width of a die lip (e.g., a dispensing slot or an array of dispensing orifices) can be dynamically adjusted in real time such that liquid coatings with various shapes can be formed. In some cases, the dynamical width adjustment is achieved by rapidly (e.g., at a rotational frequency no less than about 0.1 Hz, no less than 0.5, no less than 1; no greater than about 100 Hz, no greater than about 50 Hz) rotating the cam inside the die body.

Coating Apparatus Including Multiple Cams

Figure 10:
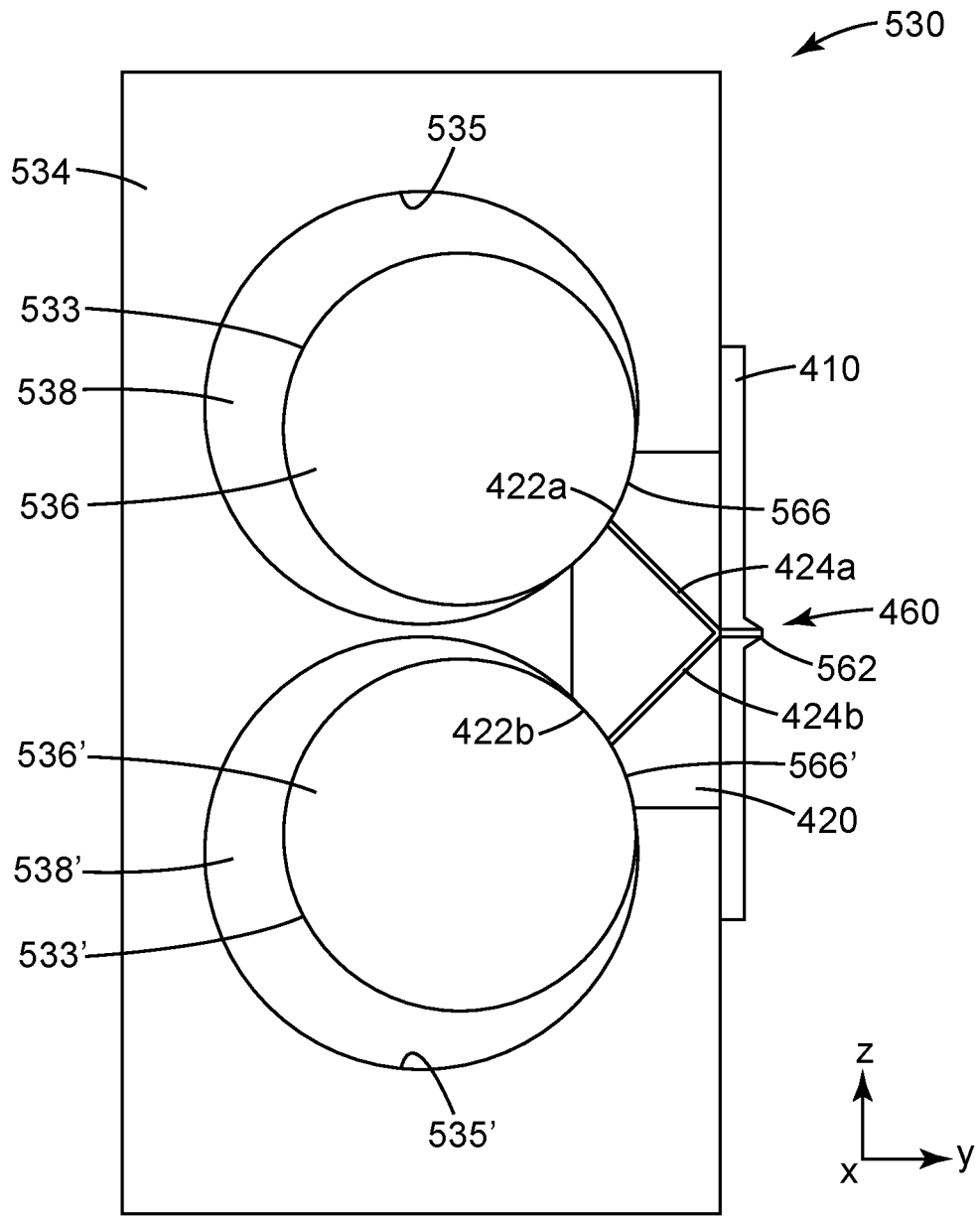
FIG. 10 illustrates a cross-sectional side view of a coating apparatus including multiple cams, according to one embodiment.

FIG. 10 illustrates a cross-sectional view of a coating apparatus 530 including multiple independent cams in a die body 534 for coating one or more fluid materials, according to another embodiment. A die body 534 of the coating apparatus 530 includes multiple bores, e.g., a first bore 538 and a second bore 538' defined by the respective inner walls 535 and 535' thereof. The first and second bores 538 and 538' can be formed with the respective central axes thereof extending substantially along a longitudinal direction of the die body 534. In some embodiments, the bores 538 and 538' may have the same or different shapes such as, for example, a cylindrical shape.

The coating apparatus 530 further includes a first cam 536 mounted inside the first bore 538, and a second cam 536' mounted inside the second bore 538'. The first and second cams 536 and 536' are pivotally mounted mostly within the respective bores 538 and 538'. The first cam 536 and the second cam 536' each may include one or more recessed areas formed into a peripheral surface thereof such as, for example, the structure of the cam 136 as shown in FIG. 5. The cam shafts of the cams 536 and 536' each can be rotated about its central axis.

In the embodiment of FIG. 10, the first and second cams 536 and 536' are disposed to be offset inside the respective bores 538 and 538'. In some embodiments, the cams 536 and 536' can be biased by one or more spring members so as to press against the respective inner walls 535 and 535' of the die body 534 on the side adjacent to the dispensing zone 460, in a manner similar as shown in the embodiment depicted in FIG. 4.

In some embodiments, the die body 534 may further include one or more inlet ports and one or more bleed ports (e.g., 150 and 152 in FIG. 2) in fluid communication with the respective first and second bores 538 and 538'. In some embodiments, multiple materials to be coated by the coating apparatus 530 can enter the respective bores, e.g., 538 and 538' of the die body 534 via the respective inlet ports. In some embodiments, a first coating material can be provided to the first bore 538 via an inlet port; a second coating can be provided to the second bore 538' via another inlet port. In some embodiments, the first and second coating materials may have substantially the same composition. In some embodiments, the first and second coating materials may have different compositions.

In some embodiments, the cams (e.g., the first and second cams 536 and 536') may include respective inner feed inlets. Multiple fluid materials can be directed into the respective inner feed inlets of the cams, which will be described further below.

The multiple coating materials can be separately dispensed through a dispensing zone 460. The dispensing zone 460 extends along a cross direction that is substantially parallel to the longitudinal direction of the die body 534 (i.e., the x axis). A substrate (e.g., a web) can be moved along a machine direction which is substantially parallel to the z axis.

The coating apparatus 530 of FIG. 10 further includes a seal plate 420 that is in sealing engagement with the die body 534 at the dispensing zone 460. In the embodiment of FIG. 10, the coating apparatus 530 further includes a die lip plate 410 with the seal plate 420 disposed between the die lip plate 410 and the die body 534. The die lip plate 410 includes a die lip 562 extending along the cross direction (e.g., the x axis). In some embodiments, the die lip 562 can include a slot, an array of orifices, or a combination thereof extending along the cross direction.

The seal plate 420 includes a first rearwardly-facing wall section 422a in sealing engagement with a portion of the peripheral surface 533 of the first cam 536 at a first opening 566 of the die body 534, and a second rearwardly-facing wall section 422b in sealing engagement with a portion of the peripheral surface 533' of the second cam 536' at a second opening 566' of the die body 534. The seal plate 420 further includes a first fluid passage 424a and a second fluid passage 424b separate from the first fluid passage 424a. The first coating material can be directed, via the first fluid passage 424a to the die lip 562; the second coating material can be directed, via the second fluid passage 424b to the die lip 562. The first and second fluid passages may have similar structures as the slot or array of orifices 24 shown in FIG. 6.

When the die lip plate 410 and the seal plate 420 are assembled to the die body 534, the slot or orifices of the die lip 562 can be in fluid communication with the first/second opening 566/566' of the die body 534 through the first/second fluid passage 424a/424b of the seal plate 420. The first/second opening 566/566' of the die body 534 may have a slot shape extending along the cross direction substantially parallel to the x axis to receive the first/second rearwardly-facing wall section 422a/422b of the seal plate 420.

In the depicted embodiment of FIG. 10, the seal plate 420 is disposed between the openings 566 and 566' of the die body 534 and the die lip plate 510 to provide sealing engagement in a liquid-tight manner. The fluid passages 424a-b of the seal plate 420 allow fluid communication between the first and second openings 566 and 566' of the die body 534 and the die lip 562 of the die lip plate 410 so as to form the dispensing zone 460. The first/second fluid passage 424a/424b of the seal plate 420 has one end fluidly connected to the die lip 562, and can include a slot, an array of orifices, or a combination thereof. It is to be understood that in some embodiments, a separate die lip plate may not be required to form the dispensing zone. For example, similar to the embodiment shown in FIG. 3', the first and second fluid passages 424a and 424b of the seal plate 420 can join to form a die lip for dispensing coating materials.

Desired materials to be coated by the coating apparatus 530 can be separately controlled by rotating the respective cams (e.g., the first and second cams 536 and 536'), and can be separately dispensed through the dispensing zone 460 (e.g., through the first fluid passage 424a or the second fluid passage 424b of the seal plate 420, and through the die lip 562) onto a moving substrate. The first cam 536 is rotatable within the first bore 538 so as to dynamically control a width or shape of a first fluid coating; the second cam 536' is rotatable within the second bore 538' so as to dynamically control a width or shape of a second fluid coating. That is, the width or shape of the multiple fluid coatings (e.g., the first and second fluid coatings) can be independently controlled.

The coating apparatus 530 in the embodiment of FIG. 10 includes two separate bores 538 and 538' to receive the first and second cams 536 and 536', respectively. It is to be understood that in some embodiments, the die body 534 can include more than two separate bores, for example, three bores, four bores, five bores, six bores, or even more. The multiple bores each can extend along the x axis with a cam being pivotally mounted therein. The multiple bores can be arranged along the machine direction, e.g., substantially parallel to the z axis. Accordingly, the seal plate can include multiple wall sections configured to provide sealing engagement for the respective bores. The seal plate may have a cross-sectional polygonal shape. Multiple protruding members (e.g., the protruding member 22 of FIG. 6) can be formed on the respective sides of the seal plate. The multiple protruding members can fit through the respective dispensing openings of the die body where the multiple wall sections can provide sealing engagement with the peripheral surfaces of the respective cams at the dispensing openings of the bores. The seal plate can further include multiple separate fluid channels which can combine into common slot or orifice channels before exiting the die lip. The multiple separate fluid channels correspond to the multiple separate bores for directing multiple coating materials.

Figure 11:
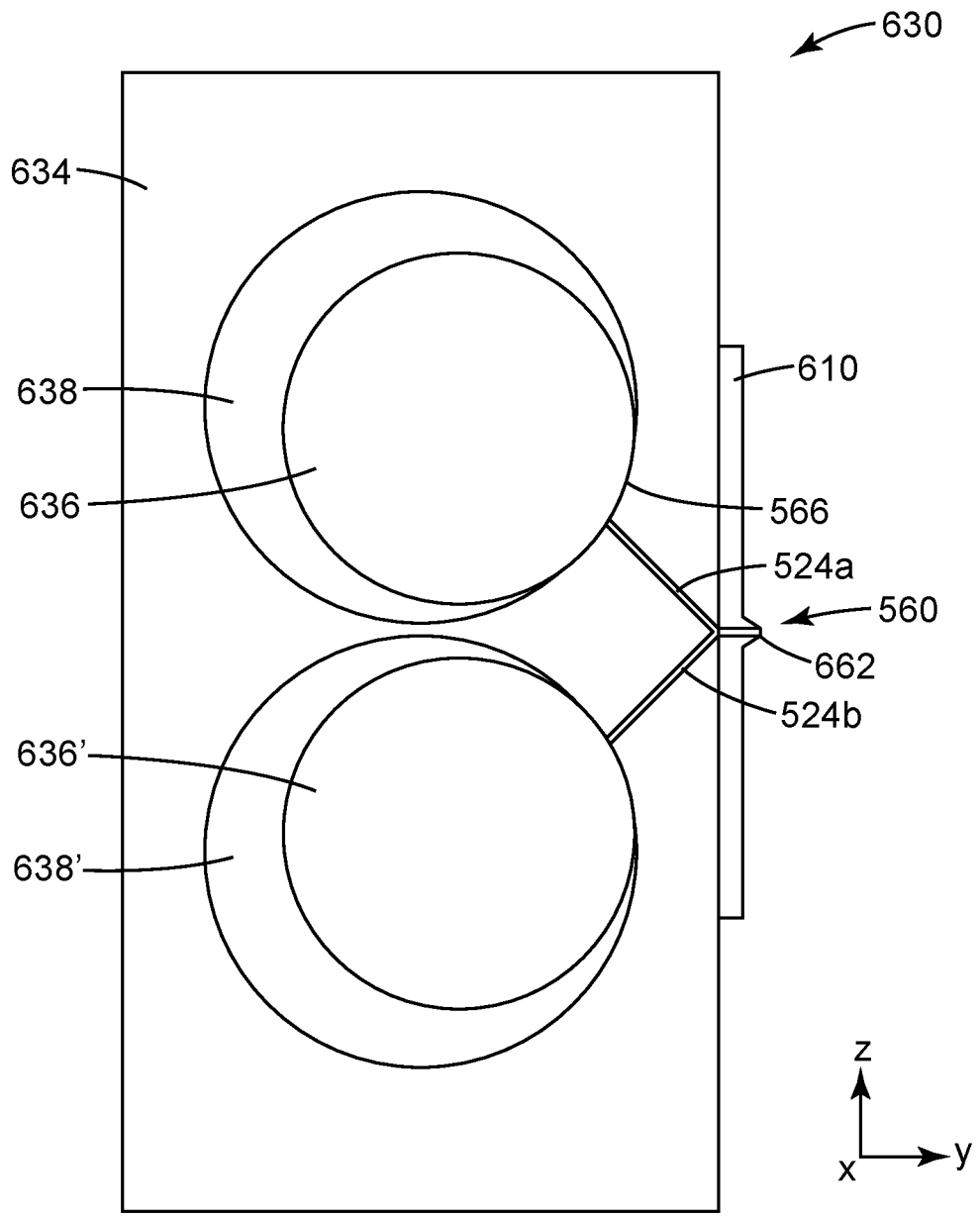
FIG. 11 illustrates a cross-sectional side view of a coating apparatus including multiple cams, according to another embodiment.

FIG. 11 illustrates a cross-sectional view of a coating apparatus 630 including multiple independent cams in a die body for coating one or more materials, according to another embodiment. Different from the coating apparatus 530 of FIG. 10, the coating apparatus 630 includes a dispensing zone 560 including a first fluid passage 524a and a second fluid passage 524b each defined by a die body 634. The first fluid passage 524a of the die body 630 has one end fluidly connected to the first bore 638, and an opposite end fluidly connected to a die lip 662; the second fluid passage 524b of the die body 630 has one end fluidly connected to the second bore 638', and an opposite end fluidly connected to the die lip 662. First and second cams 636 and 636' are received by the respective first and second bores 638 and 638', and have their respective surface in direct contact with the openings of the respective first and second fluid passages 524a and 524b. The first and second cams 636 and the second cam 636' may have different or similar structures such as the cam 136 of FIG. 5. The first cam 636 is rotatable within the die body so as to dynamically control a width or shape of a first fluid coating; the second cam 636' is rotatable within the die body so as to dynamically control a width or shape of a second fluid coating.

Figure 12:
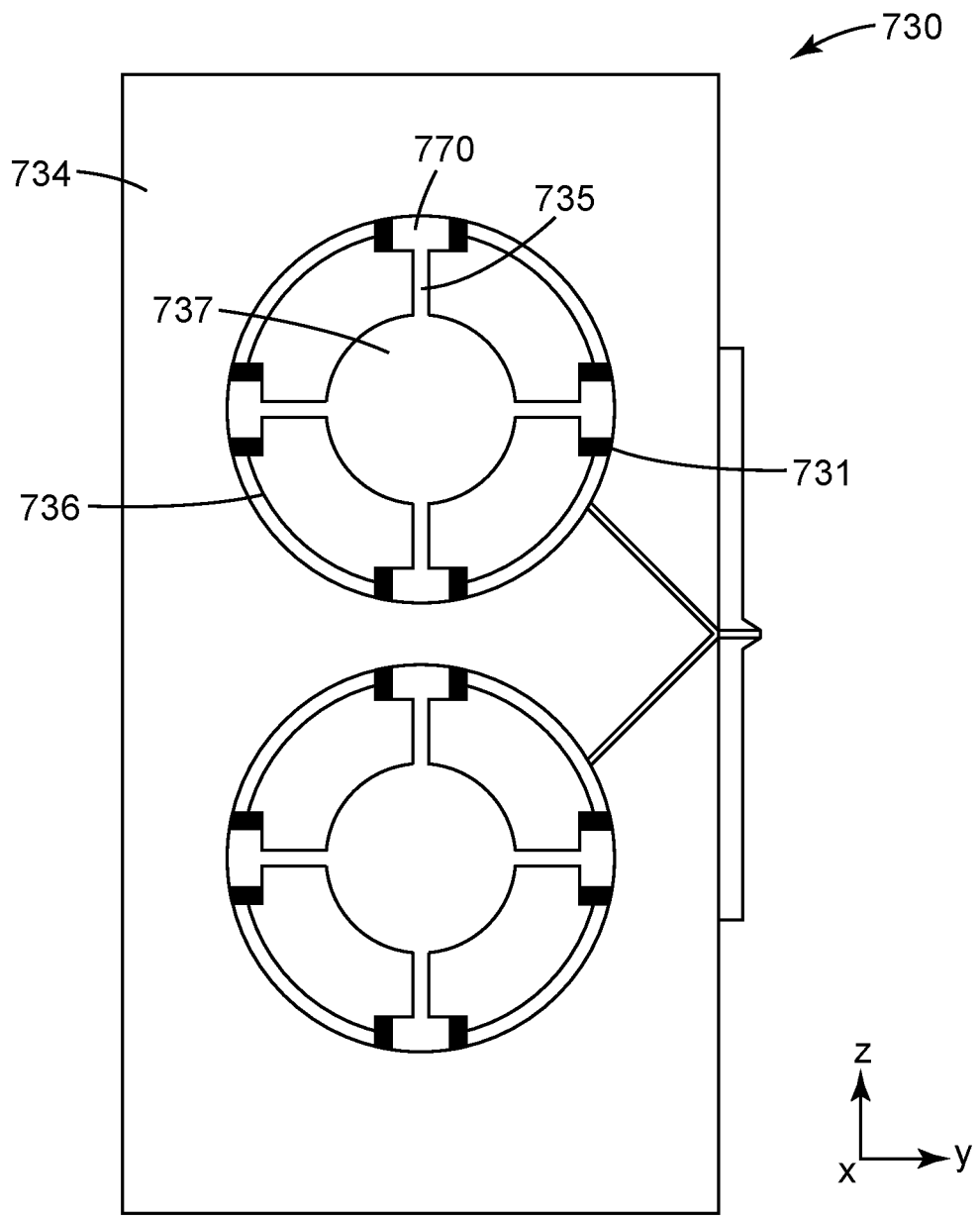
FIG. 12 illustrates a cross-sectional side view of a coating apparatus including multiple cams, according to another embodiment.

In some embodiments, for the coating apparatus described herein, one or more coating materials can be directly feed into the body of the one or more cams, instead of being directed into the one or more bores of the die body. FIG. 12 illustrates a cross-sectional view of a coating apparatus 730 including multiple independent cams in a die body for coating one or more materials, according to another embodiment. The coating apparatus 730 includes first and second cams 736 and 736' respectively received by first and second bores 738 and 738' defined by the die body 734. The first and second cams 736 and 736' each include a fluid feed inlet 737 or 737' to receive the respective coating materials. At least one recessed area 770 or 770' is formed into a peripheral surface 733 or 733' of the cams 736 or 736'. The recessed area 770 or 770' can define at least one cavity or dispensing chamber to receive coating materials from the respective fluid feed inlet 737 or 737' via the respective fluid pathway 735 or 735'. The fluid pathway 735 or 735' extends approximately along the radial direction to fluidly connect the interior and exterior of the cams. Dynamic seals 731 and 731' are provided to fluidly seal the recessed areas 770 and 770' when the cams 736 and 736' are assembled into the bores of the die body 734. The dynamic seals can move along with the respective cams and provide sealing when the cams rotate within the bores. The dynamic seals can be made from, for example, metals, polymers, rubbers, foams, ceramics or other materials suitable for sealing between surfaces with relative motion known to those skilled in the art.

Figure 13A:
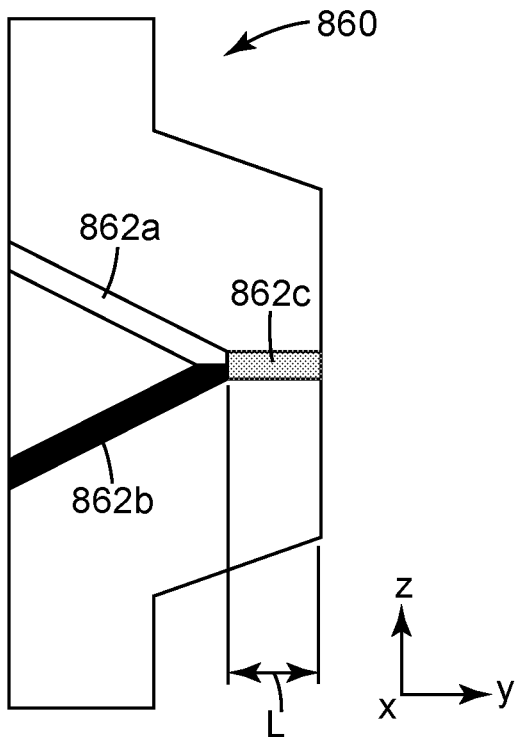
FIG. 13A illustrates a cross-sectional partial view of a dispensing zone including multiple fluid passages, according to one embodiment.
Figure 13B:
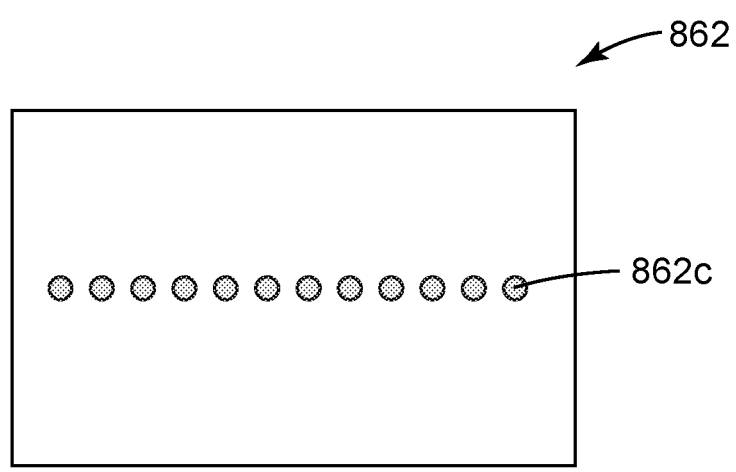
FIG. 13B illustrates a side view of the dispensing zone of FIG. 13A.

The coating apparatus having multiple cams described herein can include a dispensing zone having various configurations and configured to dispense one or more coating materials therefrom. FIGS. 13A-B illustrate an enlarged portion view of a dispensing zone 860, according to one embodiment. The dispensing zone 860 includes a first fluid passage 862a, a second fluid passage 862b, and a third fluid passage 862c. The first passage 862a is configured to receive a coating material from a first bore (e.g., 538 of FIG. 10) or a first cam (e.g., 736 of FIG. 12); the second 862b is configured to receive a coating material from a second bore (e.g., 538' of FIG. 10) or a second cam (e.g., 736' of FIG. 12). The first and second passages 862a and 862b converge into the third fluid passage 862c, which dispenses the one or more coating materials through an outlet thereof (e.g., a die lip 862). The third fluid passage 862c can include an array of orifices (as shown in FIG. 13B) or a slot. The length "L" of the third fluid passage 862c may vary in different applications. In some embodiments, a first coating material and a second coating material can be alternately directed into the third fluid passage 862c via the first passage 862a and the second passage 862b, respectively.

Figure 14A:
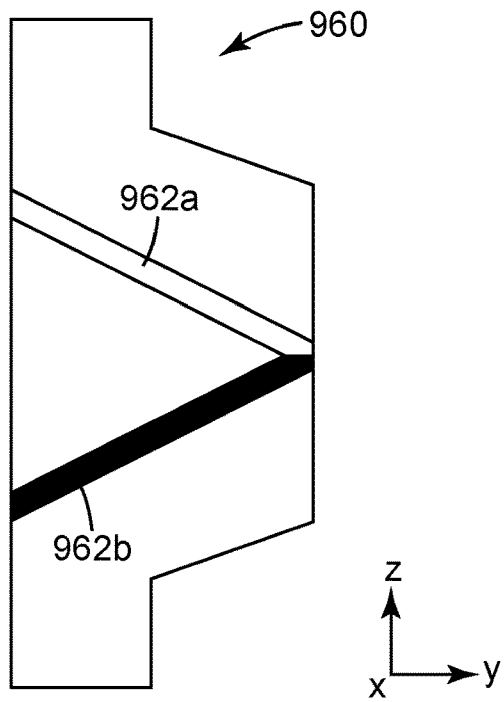
FIG. 14A illustrates a cross-sectional partial view of a dispensing zone including multiple fluid passages, according to one embodiment.
Figure 14B:
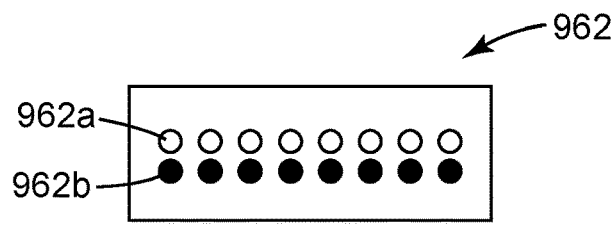
FIG. 14B illustrates a side view of the dispensing zone of FIG. 14A, according to one embodiment.
Figure 14C:
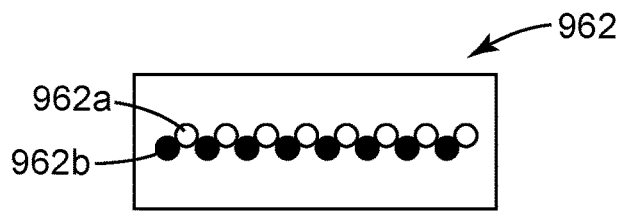
FIG. 14C illustrates a side view of the dispensing zone of FIG. 14A, according to another embodiment.
Figure 14D:
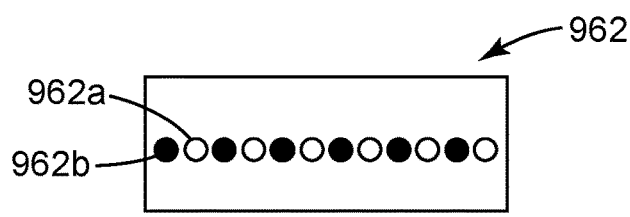
FIG. 14D illustrates a side view of the dispensing zone of FIG. 14A, according to another embodiment.

FIGS. 14A-B illustrate an enlarged portion view of a dispensing zone 960, according to other embodiments. The dispensing zone 960 includes a first fluid passage 962a and a second fluid passage 962b. The first passage 962a is configured to receive a coating material from a first bore (e.g., 538 of FIG. 10) or a first cam (e.g., 736 of FIG. 12); the second 962b is configured to receive a coating material from a second bore (e.g., 538' of FIG. 10) or a second cam (e.g., 736' of FIG. 12). The first and second passages 962a and 962b are separate and each can dispense the one or more coating materials out. The first and second passages 962a and 962b each can include an array of orifices (as shown in FIG. 13B) or a slot. In some embodiments, the first coating material can be directed into the first passage 962a and dispensed out of the die lip through the outlet of the first passage 962a; the second coating material can be directed into the second passage 962b and dispensed out of the die lip 962 through the outlet of the second passage 962b. The outlets of the first and second passages 962a and 962b can be arranged in various pattern as shown in FIGS. 14B-D. In the embodiment of FIG. 14B, the outlets of the first fluid passage 962a are arranged as a straight light that is substantially parallel to that of the second fluid passage 962b. In the embodiment of FIG. 14C, the outlets of the first and second fluid passages 962a and 962b are arranged in a staggered pattern. In the embodiment of FIG. 14D, the outlets of the first and second fluid passages 962a and 962b are alternatingly arranged in a straight line. It is to be understood that any suitable combinations or variations of the patterns in FIGS. 14A-D can be used.

Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

LISTING OF EXEMPLARY EMBODIMENTS

Exemplary embodiments in the present disclosure are listed below. It is to be understood that any of embodiments 1-22 and 23-24 can be combined.

Embodiment 1 is a coating apparatus comprising:
a die body including an inner wall defining a bore and a dispensing opening extending along a cross direction;
a cam having at least a portion being pivotally mounted within the bore, the cam comprising one or more recessed areas formed into a peripheral surface of the cam, the recessed areas of the cam being capable of intersecting with the dispensing opening of the die body to form one or more fluid connection regions;
a seal plate being attached to the die body and configured to provide sealing engagement therebetween, the seal plate including an opening aligned with the dispensing opening of the die body;
wherein the peripheral surface of the cam is in sealing engagement with the seal plate to at least partially block the opening of the seal plate, and the cam is rotatable about a central axis thereof within the die body to vary the fluid connection regions such that a width or shape of a dispensed fluid coating is dynamically changeable.

Embodiment 2 is the coating apparatus of embodiment 1, wherein the seal plate includes a protruding member fitting through the dispensing opening of the die body.

Embodiment 3 is the coating apparatus of embodiment 2, wherein the protruding member of the seal plate includes a rearwardly-facing wall section configured to be in sealing engagement with the peripheral surface of the cam.

Embodiment 4 is the coating apparatus of embodiment 2, wherein the opening of the seal plate includes a slot extending through the protruding member.

Embodiment 5 is the coating apparatus of embodiment 1, wherein the opening of the seal plate includes an array of orifices arranged in the cross direction.

Embodiment 6 is the coating apparatus of any one of embodiments 1-5, further comprising one or more spring members configured to press at least one of the cam and the seal plate against each other.

Embodiment 7 is the coating apparatus of any one of embodiments 1-6, wherein the cam is positioned offset inside the bore.

Embodiment 8 is the coating apparatus of any one of embodiments 1-7, wherein at least one of the recessed areas on the peripheral surface of the cam is defined by a bottom surface and a side wall, the bottom surface extending along a peripheral direction of the cam, and the side wall extending with a depth d in a radial direction of the cam.

Embodiment 9 is the coating apparatus of any one of embodiments 1-8, wherein at least one of the recessed areas has a varying width or shape along a peripheral direction of the cam.

Embodiment 10 is the coating apparatus of any one of embodiments 1-9, wherein the cam further comprises a solid sealing region inside at least one of the recessed areas, the solid sealing region being in sealing engagement with the inner wall of the die body.

Embodiment 11 is the coating apparatus of any one of embodiments 1-10 further comprising a die lip plate including a die lip aligned with the opening of the seal plate.

Embodiment 12 is the coating apparatus of embodiment 11, wherein the seal plate is disposed between the die body and the die lip plate.

Embodiment 13 is the coating apparatus of embodiment 11 or 12, wherein the seal plate and the die lip plate have a one-piece structure.

Embodiment 14 is the coating apparatus of any one of embodiments 1-13, wherein the fluid coating is dispensed from fluid connection region of the die lip onto a substrate, and the substrate is movable along a machine direction relative to the die body.

Embodiment 15 is the coating apparatus of embodiment 14, wherein an outer end of the die lip and the substrate are positioned with a gap therebetween.

Embodiment 16 is the coating apparatus of embodiment 14 or 15, wherein the machine direction is substantially perpendicular to the central axis of the cam.

Embodiment 17 is the coating apparatus of any one of embodiments 14-16, wherein the fluid coating on the substrate has a substantially uniform thickness.

Embodiment 18 is the coating apparatus of any one of embodiments 14-17, wherein the fluid coating on the substrate has a variable thickness along the machine direction.

Embodiment 19 is the coating apparatus of any one of embodiments 1-18 further comprising a servo motor functionally connected to the cam and configured to dynamically rotate the cam.

Embodiment 20 is the coating apparatus of any one of embodiments 1-19 further comprising a pump in fluid communication with the input ports, the pump being configured to supply the fluid coating into the bore of the die body at an adjustable flow rate.

Embodiment 21 is the coating apparatus of embodiment 20 further comprising a control system functionally connected to the cam and the pump to simultaneously control the rotation of the cam and the flow rate.

Embodiment 22 is the coating apparatus of any one of embodiments 1-21 further comprising an inlet port disposed on the side of die body opposite to the dispensing opening.

Embodiment 23 is a method comprising:
providing a die body including an inner wall defining a bore and a dispensing opening extending along a cross direction;
providing a cam having at least a portion being pivotally mounted within the bore, the cam comprising one or more recessed areas formed into a peripheral surface of the cam, the recessed areas of the cam being capable of intersecting with the dispensing opening of the die body to form one or more fluid connection regions;
providing a seal plate attached to the die body and configured to provide sealing engagement therebetween, the seal plate including an opening aligned with the dispensing opening of the die body, and the peripheral surface of the cam being configured to be in sealing engagement with the seal plate to at least partially block the opening of the seal plate;
supplying fluid at a flow rate into the bore of the die body; and
rotating the cam about a central axis thereof within the die body while dispensing the fluid to vary the fluid connection regions such that a width or shape of a dispensed fluid coating is dynamically changeable.

Embodiment 24 is the method of embodiment 23, further comprising adjusting the flow rate of the liquid while rotating the cam.

Embodiments for Coating Apparatuses Including Multiple Cams and Methods of Using the Same:

Embodiment 25 is a coating apparatus comprising:
a die body;
a plurality of bores including first and second bores inside the die body, the bores extending along a cross direction of the die body and being fluidly separated from each other; and
a plurality of cams including first and second cams each having at least a portion being pivotally mounted within the respective first or second bore to control dispensing of a first or second fluid material therefrom, the first and second cams each comprising one or more recessed areas formed into a peripheral surface thereof; and
a dispensing zone configured to dispense the first and second fluid materials,
wherein the cams are rotatable within the die body such that a width or shape of a first fluid coating of the first fluid material and a second fluid coating of the second fluid material are dynamically, independently changeable.

Embodiment 26 is the coating apparatus of embodiment 25, wherein the dispensing zone comprises a plurality of fluid passages including first and second fluid passages configured to direct the first and second fluid materials, respectively.

Embodiment 27 is the coating apparatus of embodiment 26, wherein the dispensing zone further comprises a seal plate attached to the die body, the seal plate including a plurality of wall sections configured to provide sealing engagement with the peripheral surfaces of the respective cams, and the plurality of fluid passages being defined by the seal plate.

Embodiment 28 is the coating apparatus of any one of embodiments 26-27, wherein the plurality of fluid passages are defined by the die body.

Embodiment 29 is the coating apparatus of any one of embodiments 26-28, wherein the first and second fluid passages converge into an output fluid passage.

Embodiment 30 is the coating apparatus of any one of embodiments 26-29, wherein the first and second fluid passages each include an array of outlets, the outlets being arranged in a staggered pattern.

Embodiment 31 is the coating apparatus of any one of embodiments 26-30, wherein the plurality of fluid passages comprise at least one slot.

Embodiment 32 is the coating apparatus of any one of embodiments 26-31, wherein the plurality of fluid passages comprise at least one array of orifices arranged in the cross direction.

Embodiment 33 is the coating apparatus of any one of embodiments 25-32, further comprising one or more spring members configured to press the cams and/or the dispensing zone against each other to form a fluid sealing contact.

Embodiment 34 is the coating apparatus of any one of embodiments 25-33, wherein at least one of the cams is positioned offset inside the respective bore.

Embodiment 35 is the coating apparatus of any one of embodiments 25-34, wherein at least one of the recessed areas on the peripheral surface of the cams is defined by a bottom surface and a side wall, the bottom surface extending along a peripheral direction of the cam, and the side wall extending with a depth d in a radial direction of the cam.

Embodiment 36 is the coating apparatus of any one of embodiments 25-35, wherein at least one of the recessed areas has a varying width or shape along a peripheral direction of the cam.

Embodiment 37 is the coating apparatus of any one of embodiments 25-36, wherein at least one of the cams further comprises a dynamic seal to dynamically seal the recessed areas, and the dynamic seal rotates along with the respective cam and is in sealing engagement with an inner wall of the die body when the respective cam rotates.

Embodiment 38 is the coating apparatus of any one of embodiments 25-37, wherein the dispensing zone comprises a die lip plate.

Embodiment 39 is the coating apparatus of embodiment 38, wherein the dispensing zone further comprises a seal plate disposed between the die body and the die lip plate.

Embodiment 40 is the coating apparatus of embodiment 39, wherein the seal plate and the die lip plate have a one-piece structure.

Embodiment 41 is the coating apparatus of any one of embodiments 25-40, wherein the one or more fluid coatings are dispensed from the dispensing zone onto a substrate, and the substrate is movable along a machine direction relative to the die body.

Embodiment 42 is the coating apparatus of embodiment 41, wherein an outer end of the dispensing zone and the substrate are positioned with a gap therebetween.

Embodiment 43 is the coating apparatus of embodiment 41 or 42, wherein the machine direction is substantially perpendicular to the cross direction.

Embodiment 44 is the coating apparatus of any one of embodiments 41-43, wherein the one or more fluid coatings on the substrate has a substantially uniform thickness.

Embodiment 45 is the coating apparatus of any one of embodiments 41-44, wherein the fluid coating on the substrate has a variable thickness along the machine direction.

Embodiment 46 is the coating apparatus of any one of embodiments 25-45 further comprising one or more servo motors functionally connected to the cams and configured to dynamically rotate the cams.

Embodiment 47 is the coating apparatus of any one of embodiments 25-46 further comprising one or more pumps in fluid communication with the input ports, the pump being configured to supply the fluid materials into the bores of the die body at an adjustable flow rate.

Embodiment 48 is the coating apparatus of embodiment 47 further comprising a control system functionally connected to the cams and the pumps to simultaneously control the rotation of the cams and the flow rate.

Embodiment 49 is a method comprising:
providing a die body having a plurality of bores including first and second bores each extending along a cross direction;
providing a plurality of cams including first and second cams each having at least a portion being pivotally mounted within the respective first and second bores, the first and second cams each comprising one or more recessed areas formed into a peripheral surface of the respective cam;
providing a dispensing zone configured to dispense a plurality of fluid materials including first and second fluid materials; and
controlling, via rotation of the first and second cams inside the respective bores, dispensing of first and second fluid materials onto a moving substrate to form a first fluid coating of the first fluid material and a second fluid coating of the second fluid material such that a width or shape of the first fluid coating and a width or shape of the second fluid coating are dynamically, independently changeable.

Embodiment 50 is the method of embodiment 49, further comprising providing the plurality of fluid materials into the respective bores.

Embodiment 51 is the method of embodiment 49 or 50, further comprising providing the plurality of fluid materials into a fluid feed inlet of the respective cams.

Embodiment 52 is the method of any one of embodiments 49-51, further comprising providing the first and second fluid materials having substantially the same composition.

Embodiment 53 is the method of any one of embodiments 49-52, further comprising providing the first and second fluid materials having substantially different compositions.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A coating apparatus comprising:
   a die body including an inner wall defining a bore, an inlet in fluid communication with the bore, and a dispensing opening extending along a cross direction;
   a cam having a cam shaft being pivotally mounted within the bore, the cam shaft comprising one or more recessed areas formed into a peripheral surface of the cam shaft, the recessed areas of the cam being capable of intersecting with the dispensing opening of the die body to form one or more fluid connection regions;
   a servo motor functionally connected to the cam to rotate the cam;
   a seal plate being attached to the die body and configured to provide sealing engagement therebetween, the seal plate including an opening aligned with the dispensing opening of the die body; and
   a die lip plate including a die lip in fluid communication with the opening of the seal plate,
   wherein the peripheral surface of the cam is in sealing engagement with the seal plate to at least partially block the opening of the seal plate, and the cam is rotatable about a central axis thereof within the die body to vary the fluid connection regions such that a width or shape of a dispensed fluid coating is dynamically changeable.

2. The coating apparatus of claim 1, wherein the seal plate includes a protruding member fitting through the dispensing opening of the die body.

3. The coating apparatus of claim 2, wherein the protruding member of the seal plate includes a rearwardly-facing wall section configured to be in sealing engagement with the peripheral surface of the cam.

4. The coating apparatus of claim 2, wherein the opening of the seal plate includes a slot extending through the protruding member.

5. The coating apparatus of claim 1, wherein the opening of the seal plate includes an array of orifices arranged in the cross direction.

6. The coating apparatus of claim 1, further comprising one or more spring members configured to press at least one of the cam and the seal plate against each other.

7. The coating apparatus of claim 1, wherein the cam is positioned offset inside the bore.

8. The coating apparatus of claim 1, wherein the die lip of the die lip plate is aligned with the opening of the seal plate.

9. The coating apparatus of claim 8, wherein the seal plate is disposed between the die body and the die lip plate.

10. The coating apparatus of claim 8, wherein the seal plate and the die lip plate have a one-piece structure.

11. The coating apparatus of claim 1 further comprising a pump in fluid communication with input ports to the die body, the pump being configured to supply the fluid coating into the bore of the die body at an adjustable flow rate.

12. The coating apparatus of claim 11 further comprising a control system functionally connected to the cam and the pump to simultaneously control the rotation of the cam and the flow rate.

13. A method comprising:
   providing a die body including an inner wall defining a bore, an inlet in fluid communication with the bore, and a dispensing opening extending along a cross direction;
   providing a cam having a cam shaft being pivotally mounted within the bore, the cam shaft comprising one or more recessed areas formed into a peripheral surface of the cam shaft, the recessed areas of the cam being capable of intersecting with the dispensing opening of the die body to form one or more fluid connection regions;
   providing a servo motor functionally connected to the cam to rotate the cam;
   providing a seal plate attached to the die body and configured to provide sealing engagement therebetween, the seal plate including an opening aligned with the dispensing opening of the die body, and the peripheral surface of the cam being configured to be in sealing engagement with the seal plate to at least partially block the opening of the seal plate;
   providing a die lip plate including a die lip in fluid communication with the opening of the seal plate,
   supplying fluid at a flow rate into the bore of the die body; and
   rotating the cam about a central axis thereof within the die body while dispensing the fluid to vary the fluid connection regions such that a width or shape of a dispensed fluid coating is dynamically changeable.

14. The method of claim 13, further comprising adjusting the flow rate of the liquid while rotating the cam.

15. A coating apparatus comprising:
   a die body including one or more inlets and one or more dispensing openings;
   a plurality of bores including first and second bores inside the die body, the bores extending along a cross direction of the die body and being fluidly separated from each other; and
   a plurality of cams including first and second cams each having a cam shaft being pivotally mounted within the respective first or second bore to control dispensing of a first or second fluid material therefrom, the first and second cams each comprising one or more recessed areas formed into a peripheral surface thereof;
   one or more servo motors functionally connected to the plurality of cams to rotate the cams; and
   a dispensing zone comprising a die lip plate including a die lip in fluid communication with the one or more dispensing openings of the die body and configured to dispense the first and second fluid materials,
   wherein the cams are rotatable within the die body such that a width or shape of a first fluid coating of the first fluid material and a second fluid coating of the second fluid material are dynamically, independently changeable.

16. The coating apparatus of claim 15, wherein the dispensing zone comprises a plurality of fluid passages including first and second fluid passages configured to direct the first and second fluid materials, respectively.

17. The coating apparatus of claim 16, wherein the dispensing zone further comprises a seal plate attached to the die body, the seal plate including a plurality of wall sections configured to provide sealing engagement with the peripheral surfaces of the respective cams, and the plurality of fluid passages being defined by the seal plate.

18. A method comprising:
   providing a die body having one or more inlets, one or more dispensing openings, and a plurality of bores including first and second bores each extending along a cross direction;
   providing a plurality of cams including first and second cams each having a cam shaft being pivotally mounted within the respective first and second bores, the first and second cams each comprising one or more recessed areas formed into a peripheral surface of the respective cam;

providing one or more servo motors functionally connected to the plurality of cams to rotate the cams;

providing a dispensing zone comprising a die lip plate including a die lip in fluid communication with the one or more dispensing openings of the die body and configured to dispense a plurality of fluid materials including first and second fluid materials; and controlling, via rotation of the first and second cams inside the respective bores, dispensing of first and second fluid materials onto a moving substrate to form a first fluid coating of the first fluid material and a second fluid coating of the second fluid material such that a width or shape of the first fluid coating and a width or shape of the second fluid coating are dynamically, independently changeable.

19. The method of claim 18, further comprising providing the plurality of fluid materials into the respective bores.

* * * * *